Sept. 12, 1967      A. A. NILSEN      3,340,793
CREPE SUZETTE MAKER
Filed Sept. 22, 1966
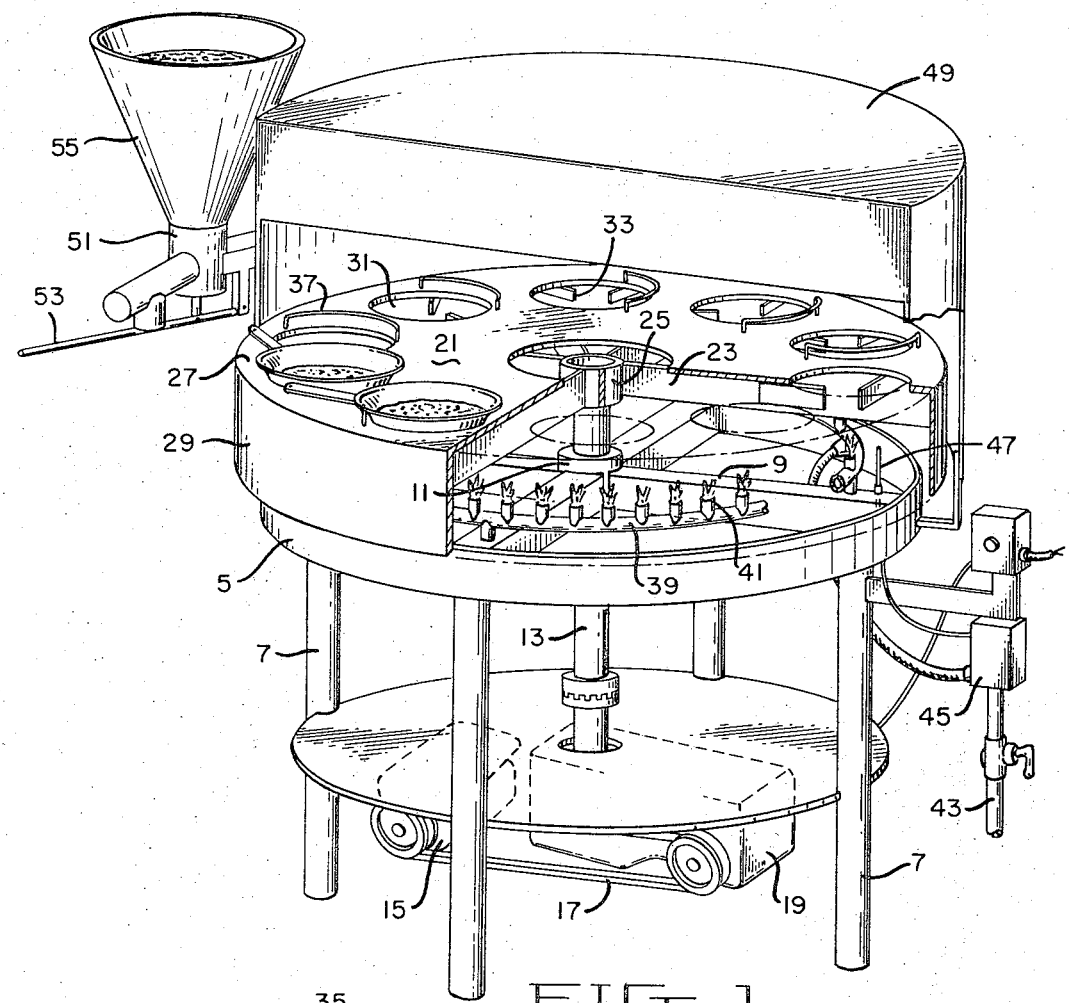
FIG. 1.
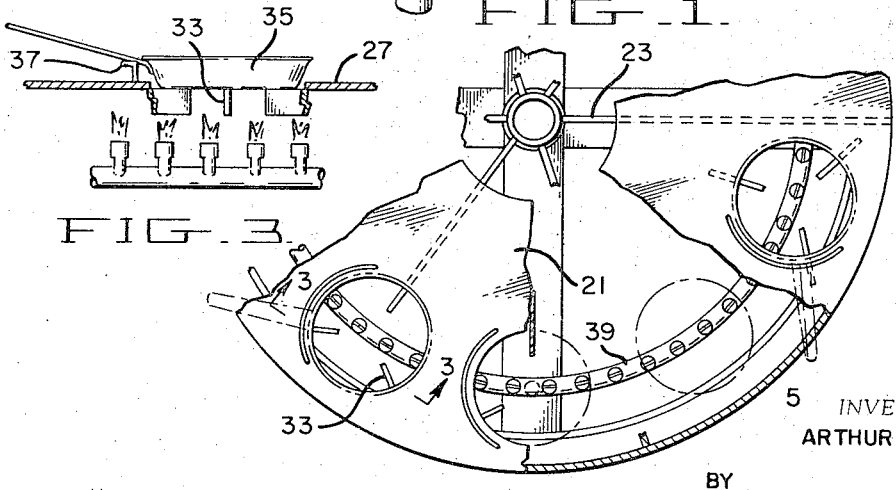
FIG. 3.
FIG. 2.
INVENTOR.
ARTHUR A. NILSEN
BY *Eckhoff and Slick*
ATTORNEYS

United States Patent Office 3,340,793
Patented Sept. 12, 1967

3,340,793
CREPE SUZETTE MAKER
Arthur A. Nilsen, San Francisco, Calif., assignor to O'Brien, Spotorno, Mitchell, Inc., a corporation of California
Filed Sept. 22, 1966, Ser. No. 581,204
1 Claim. (Cl. 99—423)

ABSTRACT OF THE DISCLOSURE

A circular rotatable conveyor table has a plurality of spaced circular holes on its periphery. A circular heating means is positioned directly under the holes. A skillet having an outwardly extending handle is placed in supported position on the table in each of the holes. About each of the holes is positioned a concentrically curved guard rail which is carried by the table. The handles of the skillets, in operative position, directly contact the guard rail and project outwardly thereover and thereby position the skillets in the holes and prevent the skillets from tilting because of the weight of the handle.

---

This invention relates to a machine for making crepe suzettes and similar articles such as omelettes. When a large number of crepe suzettes must be made, as in prepackaging airline meals or in preparing frozen crepe suzettes, it has heretofore been necessary to make the crepe suzettes in skillets on an ordinary stove or a series of hotplates. This requires that the operator walk up and down the line and judge the time when the crepe suzettes must be turned over or removed so that this has been a highly inefficient operation.

In accordance with the present invention, an improved form of cooking device is provided wherein the skillet elements pass by the operator so that the operator can remain in one place at all times. This prevents lost motion on the part of the operator and also serves as a timing device, since it is easy to regulate the rotational speed of the cooking device in such a manner that the crepe suzettes will be perfectly cooked on one side after one revolution and then can be turned over and cooked on the other side during the next revolution. Thus, with the device of the present invention a more uniform product is possible and also there is a great saving in the labor of making the crepe suzettes.

It is therefore an object of the present invention to provide a cooking device for crepe suzettes or the like of generally improved design.

Another object of this invention is to provide a cooking device having a series of openings therein on a rotating table so that one revolution of the device serves to time the cooking operation.

Another object of this invention is to provide an improved cooking device having guard means associated therewith, said guard means serving the dual purpose of accurately locating skillets on the cooking device and also for preventing the weight of the handle of the skillet from upsetting the skillet.

Other objects and features of the invention will be apparent from the specification which follows.

In the drawings forming part of this application:

FIGURE 1 is a perspective view of a cooking device embodying the present invention with certain parts cut away;

FIGURE 2 is a partial plan view of the rotating table structure shown in FIGURE 1; and FIGURE 3 is a section on the line 3—3 of FIGURE 2.

Turning now to a description of the drawing by reference characters, the cooking device of the present invention comprises a circular framework 5 supported by suitable legs 7. The framework 5 includes cross members 9 supporting a central bearing 11 in which shaft 13 is journaled for rotation. Shaft 13 is driven by means of motor 15 through belt 17 and a gear reduction unit 19 so that the shaft 13 rotates at a slow, constant speed. Mounted on said shaft 13 for rotation therewith is a circular metal table 21 supported by members 23 and affixed by hub 25 to the shaft 13. The table 21 has a flat top portion 27 and a downwardly extending skirt 29. The table is provided with a series of circular openings 31 therein, each of which is provided with a plurality of support bars 43 adapted to support a skillet 35. It will be noted from FIGURE 3 that the skillet 35 rests on the support bars 33 and does not form a tight fit with the opening 31 so that there is a free circulation of rising hot air and gas around the edge of the skillet. Also mounted on the table top 27 are a series of curved guard members 37 which serve a two-fold purpose. In the first place, the guard members 37 serve to accurately locate a skillet in the center of the opening so that it is only necessary for the operator to place the skillet over the opening and against the guard member to make sure that it is properly located. In the second place, if there is any tendency for the skillet to tip, the handle of the skillet is supported, as is best seen in FIGURE 3, preventing such tipping motion.

Directly under the centers of the openings 31 is a circular heating element 39. Although this might be an electric element, it is preferred to use a gas element having a series of burners 41 supplied from a gas main 43 with a control box 45 having the usual temperature sensing element 47 thereon whereby the supply of gas will be shut off should the flame go out for any reason.

A hood 49 may be provided which at least partially covers the rotating table preventing drafts and contamination. Preferably the structure also includes a metering device 51 wherein one stroke of the handle 53 dispenses a desired quantity of batter from a hopper 55.

In order to use the device, it is only necessary to fill the hopper 55 with a desired batter and to ignite the burner elements 41. The operator then places the skillet under the metering device 51 and a single operation of handle 53 discharges the correct amount of material into a skillet. The operator then places the skillet on one of the openings 31. In placing the skillets on the openings 31, the operator merely places the skillet in the neighborhood of the opening and then draws it against the guard 37 as is best shown in FIGURE 3. Therefore, it is easy for the operator to quickly and accurately locate the skillets. After the skillet has made one complete revolution, the material will be cooked and, if it is desired to cook both sides of the material, it can be inverted, or if cooking on only one side is desired, the material can be removed and the skillet immediately refilled. Since the rotation of the device is quite slow, it is easy for an operator to process each skillet in turn as it comes in front of the operator.

It is believed apparent from the foregoing that I have provided an improved form of crepe suzette maker which greatly increases output of an operator and which aids in obtaining a uniformly cooked product.

I claim:

A cooking device for crepe suzettes or the like comprising in combination:
(a) a circular planar table,
(b) means for rotating said table at a slow, constant speed,
(c) a plurality of equally spaced circular holes on the periphery of said table, each of said holes having supporting bars thereunder carried by said table, (d) heating means extending in a circle under said table, said heating means lying directly under said holes,
(e) a mating skillet having a handle for each of said holes supported by said bars, and
(f) each of said circular holes having an adjacent concentrically curved guard means fastened to the table and extending upwardly from the plane thereof, the handles of said skillets, in operative position, directly contacting said guard means and locating said skillets directly over said holes and preventing the skillets from tilting.

References Cited

UNITED STATES PATENTS

| | | | |
|---|---|---|---|
| 1,794,745 | 3/1931 | Ward | 126—33 |
| 1,847,752 | 3/1932 | Coleman | 99—423 |
| 2,369,274 | 2/1945 | Beatty | 99—423 |
| 2,542,265 | 2/1951 | Staples | 99—423 |
| 2,556,808 | 6/1951 | Harris | 99—423 |
| 2,762,320 | 9/1956 | Ireland | 107—60 |
| 2,920,177 | 1/1960 | Brane. | |

WALTER A. SCHEEL, *Primary Examiner.*

J. M. NEARY, *Assistant Examiner.*